May 18, 1965 F. G. FREEMAN 3,183,741
VARIABLE SPEED POWER TRANSMISSION MECHANISM
Filed April 11, 1963
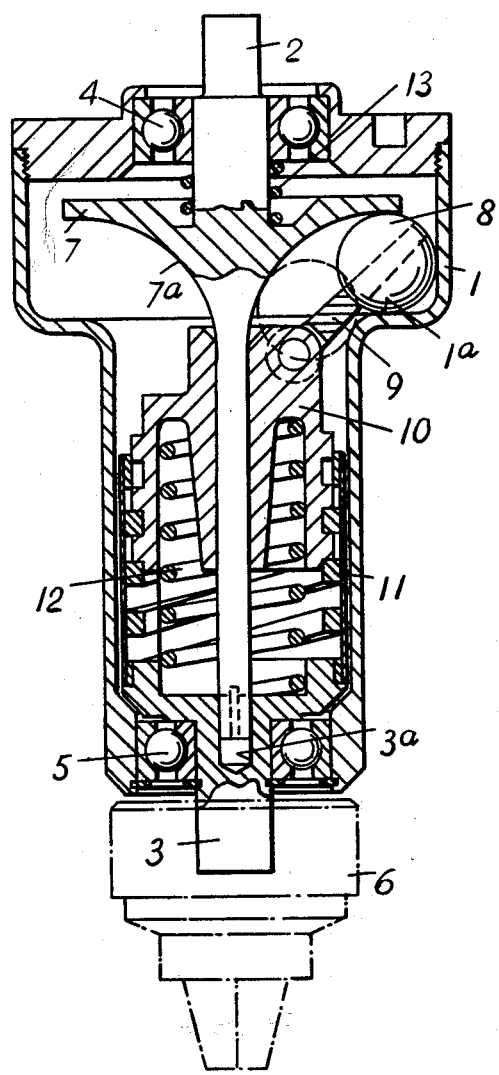

United States Patent Office 3,183,741
Patented May 18, 1965

3,183,741
VARIABLE SPEED POWER TRANSMISSION MECHANISM
Frank George Freeman, Solihull, England, assignor to Joseph Lucas (Industries) Limited, Birmingham, England
Filed Apr. 11, 1963, Ser. No. 272,332
2 Claims. (Cl. 74—751)

The object of this invention is to provide a convenient form of variable speed power transmission mechanism of the kind wherein the speed ratio will be varied automatically to accord with the load.

Mechanism according to the invention comprises in combination an input shaft on which is a tapering annular shoulder, a co-axial output shaft, a relatively fixed housing an internal peripheral part of which is uniformly spaced from the shouldered part of the input shaft, an axially movable member in quick pitch screw-thread, or equivalent engagement with the output shaft, a plurality of arms pivotally connected to the member, an equal number of balls engaged respectively within the arms, said balls being in frictional engagement with both the shouldered part of the input shaft and the housing, and resilient means acting between the member and output shaft to urge the balls into contact with the outer portion of the shoulder, the arrangement being such that rotation of the input shaft in one direction will cause the balls to move orbitally, and thereby rotate the member and output shaft at a speed ratio dependent upon their radial position, whilst an increase in load on the output shaft will cause the member to move axially against the action of the spring to reduce the speed ratio.

The accompanying drawing is a sectional side view of an example of the invention as applied to a transmission mechanism for use with portable electric drills.

Referring to the drawing, there is provided a housing 1 in which is mounted an input shaft 2 and a co-axial output shaft 3. One end (hereinafter termed the inner end) of the input shaft 2 extends from the housing and is adapted to be gripped within the chuck of the drill, whilst the adjacent end of the housing is adapted to be secured against angular movement relative to the body of the drill by a dowel, or other means. Moreover, at the inner end of the housing is an anti-friction bearing 4 in which the input shaft 2 is journalled, the opposite end of the input shaft being freely rotatable in a socket 3ª in the output shaft 3. The latter is journalled in an anti-friction bearing 5 at the outer end of the housing, and extends therefrom for the attachment thereto of a second chuck 6.

Within the housing there is formed on, or secured to the input shaft 2 of a flange-like part 7 which defines at its outer side a tapering annular shoulder 7ª. Conveniently (as shown), the shoulder 7ª is of concave arcuate form in cross-section, but essentially the adjacent internal periphery 1ª of the housing is complementarily formed so as to define an annular space of constant width between it and the shoulder 7ª. Within this space are a plurality of equi-angularly spaced balls 8 which are in frictional driving engagement with both the shoulder 7ª and the internal periphery 1ª of the housing. Each ball 8 is mounted in a separate cage in one respectively of an equal number of arms 9 pivotally connected to a member 10 slidably mounted about the outer portion of the input shaft 2, the pivotal connections between the arms 9 and member 10 being about axes which are parallel to tangents to the input shaft 2.

The member 10 has quick-pitch screw-thread connection with a sleeve 11, formed on, or (as shown) secured to the output shaft 3, whilst acting between the member 10 and the output shaft 3 is a coiled compression spring 12 which serves to load the member axially in a direction to cause the balls 8 to assume a position between the radially outer portion of the shoulder 7ª and the housing.

The output shaft 3 is prevented from axial movement in the housing, but the input shaft 2 is permitted limited axial movement and is loaded in an outward direction by a spring 13 to cause the shoulder 7ª to bear against the balls 8, and thereby press them against the housing.

When the input shaft 2 is rotated in one direction the balls 8 will be caused to roll on the internal periphery 1ª of the relatively fixed housing, and thereby move orbitally around the axis of the input shaft. As a result the member 10 together with the output shaft 3 will be rotated at a speed ratio dependent upon the radial position of the balls. Moreover, when the output shaft 3 is rotatable freely, the compression spring 12 will prevent the member 10 from being moved axially thereby providing a relatively high speed ratio. However, with increasing load on the output shaft 3, the screw-thread or equivalent connection between the output shaft and the member 10 will cause the latter to move axially thereby moving the balls 8 radially inwards and reducing the speed ratio to accord with the load.

It is to be understood that the invention is not limited to a transmission mechanism for use with drills, since by suitable modifications the mechanism may be used for a variety of purposes.

Having thus described my invention what I claim as new and desire to secure by Letters Patent is:

1. A variable speed power transmission comprising in combination an input shaft on which is a tapering annular shoulder, a co-axial output shaft, a relatively fixed housing an internal peripheral part of which is uniformly spaced from the shouldered part of the input shaft, an axially movable member in quick pitch screw-thread engagement with the output shaft, a plurality of arms pivotally connected to the member, an equal number of balls engaged respectively within the arms, said balls being in frictional engagement with both the shouldered part of the input shaft and the housing, and resilient means acting between the member and output shaft to urge the balls into contact with the outer portion of the shoulder, the arrangement being such that rotation of the input shaft in one direction will cause the balls to move orbitally, and thereby rotate the member and output shaft at a speed ratio dependent upon their radial position, whilst an increase in load on the output shaft will cause the member to move axially against the action of the spring to reduce the speed ratio.

2. A variable speed power transmission mechanism as claimed in claim 1 in which the input shaft is permitted limited axial movement in the housing against the action of further resilient means serving to urge the tapering shoulder towards the balls.

No references cited.

DON A. WAITE, *Primary Examiner.*